OR RE 29,032

United S E Re. 29,032
Robertson et Reissued Nov. 9, 1976

[54] 3-BENZOYLFLUORO-METHANESULFONANILIDES

[75] Inventors: Jerry E. Robertson, North Oaks; Joseph K. Harrington, Lake Elmo; Donald C. Kvam, North Oaks, all of Minn.

[73] Assignee: Riker Laboratories, Inc., Northridge, Calif.

[22] Filed: Nov. 17, 1975

[21] Appl. No.: 632,572

Related U.S. Patent Documents

Reissue of:

[64] Patent No.: 3,576,866
Issued: Apr. 27, 1971
Appl. No.: 832,824
Filed: June 12, 1969

U.S. Applications:

[63] Continuation-in-part of Ser. No. 588,338, Oct. 21, 1966, abandoned and a continuation-in-part of Ser. No. 719,741, April 8, 1968, abandoned.

[52] U.S. Cl. ..... 260/556 F; 424/321; 260/556 A; 260/570 AB

[51] Int. Cl.[2] ..... C07C 143/74

[58] Field of Search ..... 260/556 A, 556 F

[56] References Cited

UNITED STATES PATENTS

| | | | |
|---|---|---|---|
| 2,075,359 | 3/1937 | Salzberg et al. | 424/250 |

FOREIGN PATENTS OR APPLICATIONS

| | | | |
|---|---|---|---|
| 1,188,591 | 9/1959 | France | 260/556 A X |
| 738,758 | 10/1955 | United Kingdom | 260/556 A X |
| 856,452 | 12/1960 | United Kingdom | 260/556 A X |

OTHER PUBLICATIONS

Rossi et al., "Annali di Chimica," vol. 56(6), June 1966, p. 733.

*Primary Examiner*—Henry R. Jiles
*Assistant Examiner*—R. W. Ramsuer
*Attorney, Agent, or Firm*—Alexander, Sell, Steldt & DeLaHunt

[57] ABSTRACT

Benzoylhaloalkanesulfonanilides of the general type

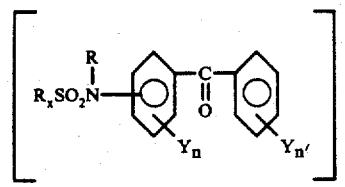

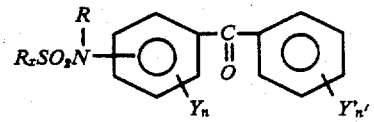

wherein $R_x$ is a haloalkyl group having up to four carbon atoms and at least one halogen atom bonded to the alpha carbon atom or if there is no halogen bonded to said alpha carbon atom, having at least 2 halogen atoms bonded to the beta carbon atom, R is hydrogen, alkyl or alkenyl containing not more than three carbon atoms, or a pharmaceutically acceptable cation; each Y *and* Y′ is selected from hydroxy, halogen and alkyl, alkoxy, haloalkyl and haloalkoxy groups having up to 4 carbon atoms and n and n′ are each 0–3. These compounds and their salts have valuable pharmacological activity as anti-inflammatory agents.

10 Claims, No Drawings

3-BENZOYLFLUORO-METHANESULFONANILIDES

Matter enclosed in heavy brackets [ ] appears in the original patent but forms no part of this reissue specification; matter printed in italics indicates the additions made by reissue.

*CROSS-REFERENCES TO RELATED APPLICATIONS*

[This application is a continuation-in-part of the copending application Ser. No. 588,338, filed Oct. 21, 1966 and now abandoned, and Ser. No. 719,741, filed Apr. 8, 1968.]

*This application is a reissue of U.S. Pat. No. 3,576,866 patented April 27, 1971 on application Ser. No. 832,824 filed June 12, 1969.*

*Application Ser. No. 832,824 was a continuation-in-part of the applications Ser. No. 588,338 filed Oct. 21, 1966 and now abandoned and Ser. No. 719,741 filed Apr. 8, 1968 and now abandoned.*

*BACKGROUND OF THE INVENTION*

The invention relates to *certain* haloalkanesulfonanilides (*specifically certain haloalkylsulfonamidobenzophenones*) which have valuable pharmacological activity, *especially anti-inflammatory activity*. Steroids having cortisone-like activity have heretofore been used for treatment of inflammatory, e.g. arthritic conditions. While these are effective, they have certain undesirable side effects. Consequently, there is a need for effective anti-inflammatory agents which are free of such disadvantages.

The novel and efficacious compounds of the present invention are non-steroidal in character, and their use does not entail side effects peculiar to steroid therapy. Of particular value in the anti-inflammatory compounds of the present invention is their relatively low toxicity, and they are well-tolerated by the gastrointestinal tract. A number of the new compounds also have anti-pyretic and analgesic activity. The pharmacological activities of these compounds have been elucidated by means of mammalian animal tests.

*The prior art also includes disclosures of certain haloalkanesulfonanilides, alleged to have protective action against the attack of textile pests, mold and bacteria. Representative of these disclosures are those contained in British Patents 738,758 and 856,452 and French Patent 1,188,591.*

*Thus, British Patent 738,758 discloses the formula*

$$[hal_x—R_1.SO_2.NH]_n—R$$

*wherein R is said to include mono- or divalent polynuclear carbocyclic radicals wherein aromatic nuclei are linked either directly by a C—C— linkage or by the bridging members —O—, —S—, —$SO_2$—, —SO—, —$CH_2$—, —CH=CH—, —CO—, —N=N—, or they are condensed, $R_1$ is an aliphatic hydrocarbon radical, x is an integer and n is 1 or 2 depending upon the valency of R. This is the only disclosure in the British Patent of any structure in which aromatic nuclei are linked by the bridging member —CO—, although theoretical lists of intermediates in the preparation of compounds containing other linking groups between aromatic rings are named as are compounds having structures in which two rings are bonded directly or are fused, or are connected through oxy, sulfonyl and azo groups.*

*British Patent 856,452 relates (inter alia) to haloalkyl (e.g. dichloromethanesulfonyl, chloroethanesulfonyl, trifluoro- or trichloromethanesulfonyl, trichloroethanesulfonyl-, etc.). Sulfonamides of amidodiphenylamines which are halogenated on one or both aromatic nuceli. It also refers to British Patent 738,758 and summarizes certain of its teachings.*

*French Patent 1,188,591 has a disclosure somewhat similar to that of British Patent 738,758 but of comparable or less pertinence to the subject matter of the present case.*

*Thus, the particular haloalkylsulfonamidobenzophenone anti-inflammatory agents of the present invention are not rendered obvious by the teachings of these foreign patents, individually or collectively.*

*DESCRIPTION OF THE INVENTION*

The present invention contemplates providing a novel class of pharmacologically active compounds, especially compounds with anti-inflammatory activity. The invention further aims to provide compositions of the novel, active compounds which are suitable for administration for pharmacological purposes. Within the purview of the invention are processes for the preparation and use of the compounds of the invention for pharmacological purposes. Still other objectives of the invention will become apparent to those skilled in the art from reading the following disclosure.

The novel benzoylhaloalkanesulfonanilides of the invention (which may also be termed haloalkylsulfonamidobenzophenones) have the formula:

Formula I

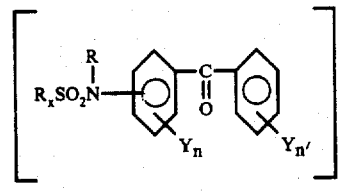

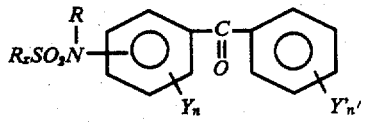

wherein $R_x$ is a haloalkyl group having up to four carbon atoms and at least one halogen atom bonded to the alpha carbon atom or if there is no halogen bonded to said alpha carbon atom, having at least 2 halogen atoms bonded to the beta carbon atoms, R is hydrogen, alkyl or alkenyl containing not more than three carbon atoms, or a pharmaceutically acceptable cation; each Y *and Y'* is selected from hydroxy, halogen and alkyl, alkoxy, haloalkyl and haloalkoxy groups having up to 4 carbon atoms and n and n' are each 0–3.

Unless otherwise specified, in the compounds of the invention, the various halogen atoms in an $R_x$ group can be the same or different, the various Y and *Y'* groups can be the same or different (regardless of whether they occur as substituents on the same ring or on the two different rings) and n and n' can be the same or different. When n and n' are both zero, the rings will be unsubstituted, i.e. the compounds will have the formulae:

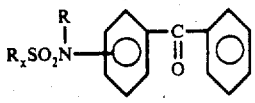

The compounds of Formula I have anti-inflammatory action when tested by standard test methods using animals, as described more particularly hereinafter.

Compounds of this invention wherein $R_x$ contains up to two carbon atoms are presently preferred, and those in which $R_x$ contains one carbon atom are most preferred. Compounds wherein the halogen in the $R_x$ is fluorine and/or chlorine are presently preferred, particularly wherein the halogen therein is all fluorine (especially compounds in which $R_x$ is $HCF_2$— or $H_2CF$—). The compounds in which $R_x$ is perfluorinated also form a preferred group, particularly trifluoromethyl.

Preferably in the foregoing groups and other compounds of the invention, the haloalkylsulfonamido group in the compounds of the invention is oriented meta to the carbonyl group.

The compounds in which n and n′ are zero, or in which one of them is zero and the other is one and the Y or Y′ is hydroxy have outstanding anti-inflammatory activity and therefore also form a preferred class.

When R is alkyl, it is preferred that R is methyl or ethyl. When Y and/or Y′ are alkyl or alkoxy, it is preferred that the alkyl and alkoxy groups contain one carbon atom. Similarly when Y and/or Y′ are haloalkyl or haloalkoxy, it is preferred that they contain one carbon atom.

The products of the present invention are effective anti-inflammatory agents and some also are analgesic and anti-pyretic agents. The anti-inflammatory activity can be conveniently demonstrated using assays designed to test the ability of these compounds to antagonize the local edema which is a characteristic of the anti-inflammatory response (rat foot edema test) and to inhibit the onset of the erythematous manifestation of inflammation (guinea pig erythema test).

The edema test is performed on adult female rats. One group of 10 rats serves as non-medicated controls, while another group of 10 rats receives the test compound at various times prior to the induction of the edema, usually 15 minutes, one hour and/or 18 hours. The test compound is administered as a suspension in 4 percent aqueous solution of acacia. Edema is induced by the plantar injection of 0.5 percent carrageenin (0.1 ml./foot) into the right hind foot. The left hind foot receives a like volume of 0.9 percent saline solution. One hour later, the volume of each hind foot is determined plethysmographically. The edema is expressed as the increase in the volume of the edemogen injected foot (volume of the "edemogen foot" less the volume of the "saline foot"). The percent inhibition is calculated by dividing the mean increase in the edema of the edemogen foot of the medicated group by the mean increase in the non-medicated group, multiplied by 100. An active dose is that giving a statistically significant inhibition of the induced edema, usually about 30–35 percent inhibition.

Leading references to this method are:

(1) Adamkiewicz et al., Canad. J. Biochem. Physio. 33: 332, 1955;

(2) Selye, Brit. Med. J. 2: 1129, 1949; and (3) Winter, Proc. Soc. Exper. Biol. Med. 111: 544, 1962.

The erythema test is performed on adult, albino guinea pigs of either sex weighing 400–600 g. Hair is removed from the abdomen of the animals by a depilatory mixture the afternoon of the day prior to the day on which they are to be used. One group of 5 animals serves as non-medicated controls, while another group of 5 receives the test compound 30 minutes prior to direct exposure to ultraviolet light. For induction of erythema, the animal is restrained on a small animal board. Three circular sections (6–8 mm. in diameter) of the ventrolateral abdominal area of the animal are then exposed to a controlled amount of ultraviolet radiation. Two hours after exposure, the erythema is scored 0–5 on the basis of its intensity and completeness (full or partial circles). The maximal score per animal is 15. The percent inhibition is calculated on the basis of the mean score for the medicated group versus the non-medicated group. An active dose is taken to be that giving a statistically significant inhibition of the induced erythema, usually 35–40 percent inhibition. Modifications of this test include variation in the time and method of drug administration.

Leading references to this method are:

(1) Wilhelm, Schweiz, Med. Wschr. 25: 577, 1949, and (2) Winder et al., Arch. Int. Pharmacodyn. 116: 261, 1958.

In the rat foot edema test and/or the guinea pig erythema test, the following compounds have been found to be effective anti-inflammatory agents (i.e., to have significant activity) at dosage levels of 100 mg./kg. or less in single doses:

3-benzoyldifluoromethanesulfonanilide,
3-benzoyldifluoromethanesulfonanilide, sodium salt,
3-benzoyl-4-hydroxytrifluoromethanesulfonanilide,
3-benzoylfluoromethanesulfonanilide,
3-(4-chloro-2-methylbenzoyl)trifluoromethanesulfonanilide,
N-methyl-3-benzoyltrifluoromethanesulfonanilide,
N-ethyl-3-benzoyltrifluoromethanesulfonanilide,
3-(4-methylbenzoyl)fluoromethanesulfonanilide,
3-(4-chlorobenzoyl)difluoromethanesulfonanilide,
3-benzoyl-2,2,2-trifluoroethanesulfonanilide,
3-(4-methoxybenzoyl)difluoromethanesulfonanilide,
3-(4-methoxybenzoyl)fluoromethanesulfonanilide,
4-benzoyldifluoromethanesulfonanilide,
3-(2-hydroxybenzoyl)trifluoromethanesulfonanilide,
3-benzoyltrifluoromethanesulfonanilide,
4-benzoyltrifluoromethanesulfonanilide,
3-(4-methylbenzoyl)trifluoromethanesulfonanilide,
3-(4-methoxybenzoyl)trifluoromethanesulfonanilide,
3-(4-chlorobenzoyl)trifluoromethanesulfonanilide,
3-(3-chlorobenzoyl)trifluoromethanesulfonanilide,
3-(2-chlorobenzoyl)trifluoromethanesulfonanilide,
3-(2-methylbenzoyl)trifluoromethanesulfonanilide,
3-benzoylperfluoroethanesulfonanilide,
3-(4-fluorobenzoyl)trifluoromethanesulfonanilide,
3-benzoyl-4-chlorotrifluoromethanesulfonanilide,
3-benzoyl-(2-hydroperfluoroethane)sulfonanilide,
3-benzoyl-4-chlorodifluoromethanesulfonanilide,
4-chloro-3-(4-chlorobenzoyl)trifluoromethanesulfonanilide,
4-chloro-3-(4-fluorobenzoyl)trifluoromethanesulfonanilide,
3-(4-fluorobenzoyl)difluoromethanesulfonanilide,
3-benzoylchloromethanesulfonanilide,
4-chloro-3-(4-fluorobenzoyl)difluoromethanesulfonanilide, and
4-chloro-3-(4-chlorobenzoyl)difluoromethanesulfonanilide.

Aspirin, which is very widely used as an anti-inflammatory agent, is only marginally active at 150 mg./kg. in the rat foot edema test.

The compounds named hereinabove, and their salts are made by the general process described hereinbelow and as further specifically illustrated in the examples.

To produce the compounds of Formula I, wherein R is hydrogen, an aminobenzophenone is condensed with a haloalkylsulfonyl halide or anhydride according to the following scheme:

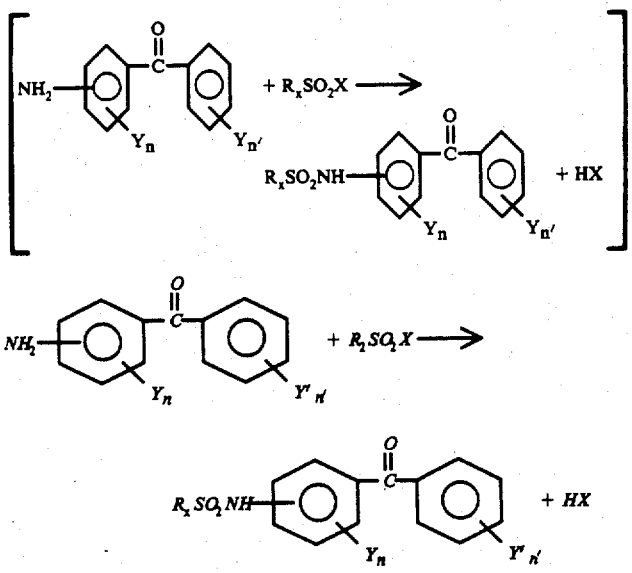

wherein $R_x$, n,n' [ and Y ] *Y and Y'* are as previously defined and X represents a halogen atom, preferably chlorine or fluorine, or the corresponding anhydride grouping $-OSO_2R_x$ ($R_x$ being defined as above). Approximately equivalent amounts of the reactants are brought together at temperatures most often ranging between about −15° and 150° C. If necessary or desirable, the reaction can be carried out in a pressure vessel. The reaction is preferably, but not necessarily, carried out in the presence of an acid acceptor such as the alkali or alkaline earth metal carbonates and bicarbonates or a tertiary amine such as pyridine, triethylamine or N,N-dimethylaniline. The amount of the acid acceptor can be varied widely; however, a 10 mole percent excess of that amount of base sufficient to bind the liberated strong acid (HX) is routinely employed.

The condensation is usually conducted in the presence of an appropriate inert organic solvent. Typical solvents suitable for this purpose are methylene chloride, chloroform, carbon tetrachloride, benzene, toluene, bis(2-methoxyethyl) ether, acetonitrile, nitromethane, and the like.

After reaction is complete, if the reaction solvent is not water miscible, the product mixture can be extracted with a dilute aqueous base solution. The product, in the form of a salt which is usually soluble in the aqueous layer, is precipitated therefrom by addition of a mineral acid such as hydrochloric or sulfuric acid, and collected by filtration. Alternatively the product mixture can be washed with aqueous hydrochloric acid, the solvent evaporated in vacuo, and the residue dissolved in a dilute aqueous base solution which is washed with dichloromethane and treated with decolorizing charcoal. The product, in the form of a salt is then isolated as described above.

If the reaction solvent is water miscible, the product is generally obtained by dilution of the reaction mixture with water. The product, a solid or oil, is separated and purified by conventional methods. The compounds prepared according to the foregoing procedures are crystalline solids purified, in general, by recrystallization from aqueous alcohol, trichloroethylene, hexane, benzene-hexane mixtures and the like. Elution chromatography has also been found to be a useful purification technique.

An additional and preferred method of obtaining the compounds of the invention in which Y *or Y'* is hydroxy is by cleavage of the alkoxy group of the comparable sulfonanilides in which Y *or Y'* is alkoxy. This can be done conveniently with hydrogen iodide-acetic acid mixtures. Alternatively, other known ether cleavage methods, e.g. hydrobromic acid-acetic acid, may be used.

When R is hydrogen in the compounds of the invention, this hydrogen is acidic in nature. Consequently, they readily form salts of alkali metals, alkaline earth metals, amines and the like. Pharmaceutically acceptable salts of these acidic compounds are included within the scope of Formula I, when R is a pharamaceutically acceptable cation.

Many of the salts are readily prepared by adding the stoichiometric amount of the selected base in inert solvent solution to the acidic compound. The resulting solution is treated to remove the solvent, e.g. by evaporation under reduced pressure. The salts are conveniently used in making pharmaceutical preparations for administration of the compounds, e.g. in capsules for oral administration. Another method for the preparation of salts of the invention is the reaction of a salt of the invention with an organic or inorganic salt in a cation exchange reaction.

Compounds of the invention wherein R is alkyl or alkenyl are readily prepared by the reaction of the compounds of the invention where R is hydrogen or a cation with an alkyl or alkenyl halide. This method for alkylation is known to the art.

Suitable haloalkanesulfonylanhydrides and halides (e.g. chlorides and fluorides) for use as starting materials in these procedures are known to the art, for example:

fluoromethanesulfonyl chloride,
fluorochloromethanesulfonyl chloride,
difluoromethanesulfonyl chloride,
dichloromethanesulfonyl chloride,
2,2,2-trifluoroethanesulfonyl chloride,
trifluoromethanesulfonyl chloride,
1,1,2,2-tetrafluoroethanesulfonyl chloride,
bromomethanesulfonyl chloride,
2,2,3,3-tetrafluoropropanesulfonyl chloride,
2-hydroperfluoropropanesulfonyl chloride, and may others disclosed e.g. in U.S. Pat. No. 2,732,398.

The aminobenzophenones used in producing the compounds of the invention are generally described in the chemical literature or can be prepared from corresponding known substituted nitrobenzophenones by reduction. Any nitrobenzophenones or aminobenzophenones not specifically disclosed in the chemical literature are prepared by methods known in the literature for analogous compounds. Exemplary of such starting materials are:

5-amino-2-chlorobenzophenone,
3-amino-4'-fluorobenzophenone,
3-amino-5-bromobenzophenone,
3-amino-4'-ethylbenzophenone,
3-amino-2'-ethoxybenzophenone,
3-amino-4'-ethoxybenzophenone, etc.

The following examples are given for the purpose of further illustrating the present invention, but are not intended to limit the scope thereof. All melting and boiling points are uncorrected. All parts are by weight unless otherwise specified in the examples.

EXAMPLE 1

Preparation of 3-benzoylfluoromethanesulfonanilide

A 500 ml flask fitted with reflux condenser was charged with 8.7 g. of N,N-dimethylaniline (0.72 mole), a solution of 12.8 g. of 3-aminobenzophenone (0.065 mole) in 50 ml. of methylene chloride, 8.6 g. of fluoromethanesulfonyl chloride (0.065 mole, B.P. 138–141° C.) and 200 ml. of methylene chloride. The mixture was heated at reflux temperature overnight, then cooled, washed twice with 500 ml. portions of 10 percent hydrochloric acid and dried over anhydrous magnesium sulfate. The solvent was removed by evaporation leaving an oil that crystallized after 3 hours in the vacuum oven to afford relatively pure product, M.P. 116–119° C. This solid was taken up in 300 ml. of 10 percent aqueous sodium hydroxide. The solution was warmed, treated with activated carbon and acidified to pH 1 with concentrated hydrochloric acid. An oil formed initially but crystallized to give a solid, M.P. 115–117° C. This was recrystallized from 95 percent ethanol to give analytically pure product, M.P. 117–120° C.

Analysis.—Calculated for $C_{14}H_{12}FNO_3S$ (percent): C, 57.3; H, 4.1. Found (percent): C, 57.7; H, 4.1.

EXAMPLE 2

Preparation of 3-benzoyldifluoromethanesulfonanilide

A one liter flask fitted with reflux condenser was charged with 0.1 mole of 3-aminobenzophenone, 10 ml. of pyridine, 0.1 mole of difluoromethanesulfonyl chloride, and 400 ml. of benzene. The mixture was heated at 50–55° C. for 72 hours and then extracted with 10 percent aqueous sodium hydroxide. Acidification of the alkaline layer produced a solid which was recrystallized from trichloroethylene-hexane mixtures to afford analytically pure product, M.P. 99–100.5° C.

Analysis.—Calculated for $C_{14}H_{11}F_2NO_3S$ (percent): C, 54.1; H, 3.6; N, 4.4. Found (percent): C, 53.9; H, 3.6; N, 4.4.

EXAMPLES 3–32

By the use of the general procedure of Examples 1 and 2 and the substitution of other haloalkanesulfonyl chlorides and other substituted aminobenzophenone starting materials, all of which are known, the following exemplary compounds are obtained:

| Ex. No. | | M.P., ° C. (uncorrected) |
|---|---|---|
| 3 | 2-benzoyldifluoromethanesulfonanilide | 79.5–8[1] |
| 4 | 3-(4-methylbenzoyl)difluoromethanesulfonanilide | 119–121 |
| 5 | 3-(4-chlorobenzoyl)difluoromethanesulfonanilide | 127–129 |
| 6 | 3-(4-methoxybenzoyl)fluoromethanesulfonanilide | 116.5–118.5 |
| 7 | 3-benzoyl-4-chlorodifluoromethanesulfonanilide | 99–102 |
| 8 | 3-benzoyl-4-chlorofluoromethanesulfonanilide | 113–116 |
| 9 | 4-benzoyldifluoromethanesulfonanilide | 124.5–126.5 |
| 10 | 2-benzoylfluoromethanesulfonanilide | 74.5–75.5 |
| 11 | 3-(4-chlorobenzoyl)fluoromethanesulfonanilide | 118–120 |
| 12 | 3-(4-n-butoxybenzoyl)fluoromethanesulfonanilide | 113–117 |
| 13 | 3-(4-t-butylbenzoyl)fluoromethanesulfonanilide | 102–105 |
| 14 | 3-(4-fluorobenzoyl)difluoromethanesulfonanilide | 80–84 |
| 15 | 3-(4-fluorobenzoyl)fluoromethanesulfonanilide | 127–129.5 |
| 16 | 3-(4-hydroxybenzoyl)difluoromethanesulfonanilide[(1)] | 150–152 |
| 17 | 2-benzoyl-4-chlorodifluoromethanesulfonanilide | 98–100 |
| 18 | 2-benzoyl-4-chlorofluoromethanesulfonanilde | 88–89.5 |
| 19 | 3-benzoyl-(2-hydroperfluoroethane)sulfonanilide | 80–80.5 |
| 20 | 3-benzoyl-(2-hydroperfluoro-n-propane)sulfonanilide | 94–96 |
| 21 | 3-benzoylchloromethanesulfonanilide | 95–97 |
| 22 | 4-chloro-3-(4-fluorobenzoyl)difluoromethane-sulfonanilide. | 101–103 |
| 23 | 4-chloro-3-(4-methylbenzoyl)difluoromethane-sulfonanilide. | 77–79 |
| 24 | 4-chloro-3-(4-chlorobenzoyl)difluoromethane-sulfonanilide. | 81–83 |
| 25 | 3-benzoyl-4-chlorochloromethanesulfonanilide | 130–133 |
| 26 | 3-(4-methylbenzoyl)chloromethanesulfonanilide | 118–119 |
| 27 | 3-(2-methylbenzoyl)chloromethanesulfonanilide | 88–89 |
| 28 | 3-(2-methylbenzoyl)fluoromethanesulfonanilide | 101–102 |

-continued

| Ex. No. | | M.P., ° C. (uncorrected) |
|---|---|---|
| 29 | 3-(2-chlorobenzoyl)chloromethanesulfonanilide | 99–101 |
| 30 | 3-(2-chlorobenzoyl)fluoromethanesulfonanilide | 123–125 |
| 31 | 3-(4-chlorobenzoyl)chloromethanesulfonanilide | 149–150 |
| 32 | 3-benzoylperfluoro-n-butanesulfonanilide | (2) |

(1) Prepared by the method of Example 84 from the compound of Example 34.
(2) B.P. 186° C./0.09 mm.

EXAMPLE 33

Preparaton of the sodium salt of 3-benzoyldifluoromethanesulfonanilide

To a solution of 12.21 g. of reagent grade sodium hydroxide (0.305 mole) in 300 ml. of water were added 95 g. of 3-benzoyldifluoromethanesulfonanilide (0.305 mole). The mixture was stirred until dissolution was complete and the solution had pH 7.2 (sensitive pH paper). Water was removed to give a yellow solid which was taken up in about 200 ml. of glyme and treated with activated charcoal. The clear solution was then added dropwise with vigorous stirring to 5 liters of ethyl ether. The crystalline salt was isolated by filtration, washed with 4 liters of ethyl ether and dried to give analytically pure product, M.P. (dec.) 235° C.

Analysis.—Calculated for $C_{14}H_{10}F_2NaNO_3S$ (percent): C, 50.45; H, 3.05. Found: (percent): C, 50.6; H, 3.2.

Other salts are made by the same process, substituting other alkali or alkaline earth metal hydroxides for sodium hydroxide. Amine salts are made using alcohol solutions of the stoichiometric amount of the amine, in a similar manner, e.g. the dimethylaminoethanol salt. Alternatively, water solutions of the amine may be used.

EXAMPLE 34

Preparation of 3-(4-methoxybenzoyl)difluoromethanesulfonanilide

A one liter flask fitted with reflux condenser was charged with 56.8 g. of 3-amino-4′-methoxybenzophenone (0.25 mole), 26.5 g. of N,N-dimethylaniline (0.30 mole), 37.8 g. of difluoromethanesulfonyl chloride (0.25 mole) and 350 ml. of methylene chloride. The mixture was heated at reflux temperature for 36 hours and then was extracted with dilute aqueous sodium hydroxide. After treatment with charcoal, acidification of the alkaline extract afforded a solid which was washed with hot heptane and recrystallized from carbon tetrachloridehexane mixtures to afford analytically pure product, M.P. 118–120° C.

Analysis.—Calculated for $C_{15}H_{13}F_2NO_4S$ (percent): C, 52.8; H, 3.9; N, 4.1. Found (percent): C, 52.6; H, 3.9; N, 4.2.

EXAMPLE 35

Preparation of 3-benzoyl-2,2,2-trifluoromethanesulfonanilide

A one liter flask was charged with 29.6 g. of 3-aminobenzophenone (0.15 mole), 9.2 g. of 2,2,2-trifluoroethanesulfonyl chloride (0.05 mole) and 250 ml. of methylene chloride. The mixture was allowed to stand for about an hour with occasional shaking. The reaction mixture was then washed with dilute hydrochloric acid to remove excess 3-aminobenzophenone, and the solvent was removed by evaporation to afford a solid product. Recrystallization of the solid from trichloroethylene and drying gave analytically pure product, M.P. 105.5–107° C.

Analysis.—Calculated for $C_{15}H_{12}F_3NO_3S$ (percent): C, 52.5; H, 3.5; N, 4.1. Found (percent); C, 52.7; H, 3.7; N, 4.1.

EXAMPLE 36

Preparation of 3-(4-methylbenzoyl)fluoromethanesulfonanilide

A 500 ml. flask fitted with reflux condenser was charged with 10.5 g. of 3-amino-4′-methylbenzophenone (0.03 mole), 6.7 g. of N,N-dimethylaniline (0.055 mole), 6.6 g. of fluoromethanesulfonyl chloride (0.05 mole) and 150 ml. of methylene chloride. The reaction mixture was heated at reflux temperature for 20 hours. Methylene chloride was then removed by evaporation, and the residue was extracted with dilute aqueous sodium hydroxide. The alkaline extract was washed with ethyl ether, treated with charcoal and acidified. The precipitated solid was recrystallized from ethanol-water mixtures to give analytically pure product, M.P. 118–120° C.

Analysis.—Calculated for $C_{15}H_{14}FNO_3S$ (percent): C, 58.7; H, 4.6; N, 4.6. Found (percent): C, 58.8; H, 4.8; N, 4.5.

EXAMPLE 37

Preparation of 3-benzoylperfluoroethanesulfonanilide

A 300 ml. Parr pressure vessel was charged with 9.85 g. of 3-aminobenzophenone (0.05 mole), 150 ml. of triethylamine and 10.1 g. of perfluoroethanesulfonyl fluoride (0.05 mole). The mixture was heated at 90–100° C. for 24 hours.

Triethylamine was removed by evaporation, yielding an oil which was taken up in benzene. The benzene solution was washed with dilute hydrochloric acid and extracted with dilute sodium hydroxide. Acidification with hydrochloric acid affords a solid which was recrystallized from ethanol-water to give white, solid product, M.P. 95–97° C.

Analysis.—Calculated for $C_{15}H_{10}F_5NO_3S$ (percent): C, 47.5; H, 2.7; N, 3.7. Found (percent): C, 47.7; H, 2.8; N, 3.7.

EXAMPLES 38–42

By the use of the general procedures of Examples 34–37 and the substitution of other haloalkanesulfonyl anhydride and halide starting materials, the following exemplary compounds are obtained.

| Example No.: | |
|---|---|
| 38 | 3-benzoylfluorochloromethanesulfonanilide. |
| 39 | 3-benzoyl-1,1,3-trihydroperfluoropropanesulfonanilide. |
| 40 | 3-benzoyldichloromethanesulfonanilide. |
| 41 | 3-benzoyl-perfluoroisopropanesulfonanilide. |
| 42 | 3-benzoylbromomethanesulfonanilide. |

EXAMPLE 43

Preparation of 3-benzoyltrifluoromethanesulfonanilide

Into a 3-necked, one liter flask equipped with stirrer, condenser, addition funnel, internal thermometer and nitrogen sweep were charged 59.8 g. of 3-aminobenzophenone (0.304 mole), 50.4 ml. of triethylamine and 400 ml. of chloroform. Trifluoromethanesulfonic anhydride was added slowly to the stirred mixture at 10–25° C. (ice-bath cooling). After stirring at room temperature for two hours, the solution was washed with dilute hydrochloric acid and then extracted with 10 percent aqueous sodium hydroxide. The aqueous extract was washed with chloroform until the washes were clear, clarified with charcoal, and acidified to pH 1 with concentrated hydrochloric acid. The product was collected by filtration, washed with water and dried. Recrystallization from hexane afforded analytically pure product, M.P. 99–101° C.

Analysis.—Calculated for $C_{14}H_{10}F_3NO_2S$ (percent): C, 51.1; H, 3.1. Found (percent): C, 51.3; H, 3.2.

EXAMPLES 44–83

By use of the procedure of Example 43 and the substitution of other aminobenzophenone starting materials, the following exemplary compounds were obtained:

| Ex. No. | | M.P., ° C. (uncorrected) |
|---|---|---|
| 44 | 2-benzoyltrifluoromethanesulfonanilide | 98–100 |
| 45 | 4-benzoyltrifluoromethanesulfonanilide | 136–137 |
| 46 | 3-(4-methylbenzoyl)trifluoromethanesulfonanilide | 129.5–131.5 |
| 47 | 3-(4-methoxybenzoyl)trifluoromethanesulfonanilide | 122.5–124.5 |
| 48 | 3-(4-fluorobenzoyl)trifluoromethanesulfonanilide | 134–136 |
| 49 | 3-(4-chlorobenzoyl)trifluoromethanesulfonanilide | 123.5–125.5 |
| 50 | 5-benzoyl-2-chlorotrifluoromethanesulfonanilide | 102–103 |
| 51 | 3-benzoyl-5-chlorotrifluoromethanesulfonanilide | 114–116 |
| 52 | 3-benzoyl-4-chlorotrifluoromethanesulfonanilide | 106–108 |
| 53 | 3-benzoyl-2-chlorotrifluoromethanesulfonanilide | 92–93 |
| 54 | 4-(2-chlorobenzoyl)trifluoromethanesulfonanilide | 144.5–146.5 |
| 55 | 4-(3-chlorobenzoyl)trifluoromethanesulfonanilide | 139–141 |
| 56 | 4-(4-chlorobenzoyl)trifluoromethanesulfonanilide | 145–147 |
| 57 | 3-benzoyl-2-methyltrifluoromethanesulfonanilide | 119–121 |
| 58 | 5-benzoyl-2-methyltrifluoromethanesulfonanilide | 84–85 |
| 59 | 3-benzoyl-5-methyltrifluoromethanesulfonanilide | 94–96 |
| 60 | 3-(3-methylbenzoyl)trifluoromethanesulfonanilide | 91–93 |
| 61 | 2-(3-methylbenzoyl)trifluoromethanesulfonanilide | 92–93 |
| 62 | 3-(2,5-dimethoxybenzoyl)trifluoromethanesulfonanilide. | 121.5–124 |
| 63 | 4-chloro-3-(4-methylbenzoyl)trifluoromethanesulfonanilide. | 88–90 |
| 64 | 4-chloro-3-(4-methoxybenzoyl)trifluoromethanesulfonanilide. | 89–90 |
| 65 | 4-chloro-3-(4-chlorobenzoyl)trifluoromethanesulfonanilide. | 82–83 |
| 66 | 4-chloro-3-(4-fluorobenzoyl)trifluoromethanesulfonanilide. | 133–134 |
| 67 | 3-(2-methylbenzoyl)trifluoromethanesulfonanilide | 92–93 |
| 68 | 4-chloro-2-(2-chlorobenzoyl)trifluoromethanesulfonanilide. | 86–88 |
| 69 | 3-(3,4-dichlorobenzoyl)trifluoromethanesulfonanilide. | 146–147 |
| 70 | 3-(2,5-dimethylbenzoyl)trifluoromethansulfonanilide. | 85–86 |
| 71 | 3-(2,3-dimethylbenzoyl)trifluoromethanesulfonanilide. | 107–109 |
| 72 | 3-benzoyl-4-methoxytrifluoromethanesulfonanilide | 131–132 |
| 73 | 3-(2-methoxybenzoyl)trifluoromethanesulfonanilide | 87–89 |
| 74 | 3-(2,6-dimethylbenzoyl)trifluoromethanesulfonanilide. | 113–114 |
| 75 | 3-(4-chloro-2-methylbenzoyl)trifluoromethanesulfonanilide. | 135–137 |
| 76 | 5-benzoyl-2-methoxytrifluoromethanesulfonanilide | 87–89 |
| 77 | 3-benzoyl-4-bromotrifluoromethanesulfonanilide | 131 |
| 78 | 3-(3,4-dimethylbenzoyl)trifluoromethanesulfonanilide. | 129 |
| 79 | 3-(2,4-dimethylbenzoyl)trifluoromethanesulfonanilide. | 106–108 |
| 80 | 3-(4-ethylbenzoyl)trifluoromethanesulfonanilide | 90–91 |
| 81 | 3-(3-fluorobenzoyl)trifluoromethanesulfonanilide | 96–98 |
| 82 | 3-benzoyl-2-methoxytrifluoromethanesulfonanilide | 132–133 |
| 83 | 3-benzoyl-5-methoxytrifluoromethanesulfonanilide | 89–91 |

EXAMPLE 84

Preparation of 3-benzoyl-4-hydroxytrifluoromethanesulfonanilide

Glacial acetic acid (20 ml.), 55% hydroiodic acid (7 ml.) and 3-benzoyl-4-methoxytrifluoromethanesulfonanilide (1.8 g., 5 mmole) were heated to reflux temperature and maintained at reflux for four hours. This reaction mixture was poured over ice, and the resulting mixture was extracted with dichloromethane. The dichloromethane layer was evaporated in vacuo to give a yellow solid. Recrystallization from benzene - cyclohexane gave light yellow 3-benzoyl-4-hydroxytrifluoromethanesulfonanilide, M.P. 133–136° C.

Analysis.—Calculated for $C_{14}H_{10}F_3NO_4S$: (percent): C, 48.7; H, 2.9; N, 4.1. Found (percent): C, 49.1; H, 2.9; N, 4.0.

EXAMPLES 85–90

By use of the general procedure of Example 84 and the substitution of other benzoylmethoxysulfonanilides, the following exemplary compounds were obtained:

| Ex. No. | | Melting point (in ° C.) |
|---|---|---|
| 85 | 3-(4-hydroxybenzoyl)trifluoromethanesulfonanilide | 156–158 |
| 86 | 3-(3-hydroxybenzoyl)trifluoromethanesulfonanilide | 169–172 |
| 87 | 5-benzoyl-2-hydroxytrifluoromethanesulfonanilide | 178–181 |
| 88 | 3-benzoyl-5-hydroxytrifluoromethanesulfonanilide | 128–130 |
| 89 | 3-benzoyl-2-hydroxytrifluoromethanesulfonanilide | 86–88 |
| 90 | 3-(2-hydroxybenzoyl)trifluoromethanesulfonanilide | 131–133 |

EXAMPLE 91

Preparation of N-ethyl-3-benzoyltrifluoromethanesulfonanilide

Sodium carbonate (6.89 g., 0.082 mole) was dissolved in distilled water (70 ml.) and 3-benzoyltrifluoromethanesulfonanilide (27.0 g., 0.082 mole) was added in small portions. Water (30 ml.) was added and the solution as stirred for three hours. The solution was filtered and the filtrate was evaporated to dryness in vacuo. The solid was dissolved in ethanol, treated with decolorizing charcoal and filtered. The filtrate was evaporated to dryness in vacuo, and the solid sodium 3-benzotrifluoromethanesulfonanilide was dried.

Analysis.—Calculated for $C_{14}H_9F_3NNaO_3S$ (percent): C, 48.0; H, 2.16. Found (percent): C, 48.0; H, 2.8.

Sodium 3-benzoyltrifluoromethanesulfonanilide (20 g., 57 mmole), acetone (250 ml.) and ethyl iodide (11.7 g., 75 mmole) were heated to reflux and maintained at reflux temperature for) 1 day. The reaction mixture was evaporated to remove solvent and the oil obtained was dissolved in chloroform. The solution was washed twice with 10 percent sodium hydroxide, twice with water and dried over magnesium sulfate; then treated with decolorizing charcoal and filtered. The solvent was removed in vacuo and the liquid product was distilled through a molecular still to give a light yellow liquid, N-ethyl-3-benzoyltrifluoromethanesulfonanilide, column temperature 170° C., pressure $1 \times 10^{-5}$ mm. of mercury.

Analysis.—Calculated for $C_{16}H_{14}F_3NO_3S$ (percent): C, 53.8; H, 3.95. Found (percent): C, 53.8; H, 4.0.

EXAMPLES 92–101

By the use of the general procedure of Example 91 and the substitution of other reactive alkyl halides or dialkyl sulfates the following exemplary compounds are obtained:

| Example No.: | |
|---|---|
| 92 | N-methyl-3-benzoyltrifluoromethanesulfonanilide. |
| 93 | N-n-propyl-3-benzoyltrifluoromethanesulfonanilide. |
| 94 | N-allyl-3-benzoyltrifluoromethanesulfonanilide. |
| 95 | N-methyl-3-benzoyldifluoromethanesulfonanilide. |
| 96 | N-methyl-3-benzoyl-4-hydroxytrifluoromethanesulfonanilide. |
| 97 | N-methyl-3-benzoylfluorochloromethanesulfonanilide. |
| 98 | N-methyl-3-(4-chlorobenzoyl)trifluoromethanesulfonanilide. |
| 99 | N-methyl-3-benzoyl-4-methoxytrifluoromethanesulfonanilide. |
| 100 | N-methyl-3-benzoylchloromethanesulfonanilide. |
| 101 | N-ethyl-3-benzoylchloromethanesulfonanilide. |

Additional compounds of the invention prepared by the foregoing general procedures are as follows:

| Ex. No. | | Melting point (in ° C.) |
|---|---|---|
| 102 | 3-(3-trifluoromethylbenzoyl) trifluoromethanesulfonanilide. | 86–88 |
| 103 | 3-(2-trifluoromethylbenzoyl)trifluoromethanesulfonanilide. | 110–111 |
| 104 | 3-(4-trifluoromethoxybenzoyl)trifluoromethanesulfonanilide. | 107–109 |

What is claimed is:

1. A compound of the formula:

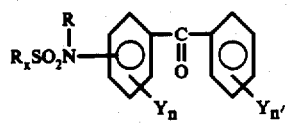

wherein $R_x$ is a haloalkyl group having up to four carbon atoms and at least one halogen atom bonded to the alpha carbon atom or if there is no halogen bonded to said alpha carbon atom, having at least 2 halogen atoms bonded to the beta carbon atom, R is hydrogen, alkyl or alkenyl containing not more than three carbon atoms, or a pharmaceutically acceptable cation; each Y is selected from hydroxy, halogen and alkyl, alkoxy, haloalkyl and haloalkoxy groups having up to 4 carbon atoms and n and n′ are each 0–3.]

[2. A compound according to claim 1 wherein the halogen atoms in the $R_x$ group are all fluorine.]

[3. A compound according to claim 2 wherein $R_x$ is a perfluoroalkyl group.]

[4. N-methyl 3-benzoyltrifluoromethanesulfonanilide according to claim 3.]

[5. 3-benzoyl-4-hydroxytrifluoromethanesulfonanilide according to claim 3.]

[6. A compound according to claim 1, in which the haloalkanesulfonamido group is in meta orientation to the carbonyl group.]

[7. A compound according to claim 6, in which $R_x$ is $HCF_2$—.]

[8. 3-benzoyldifluoromethanesulfonanilide according to claim 7.]

[9. The sodium salt of 3-benzoyldifluoromethanesulfonanilide according to claim 7.]

[10. A compound according to claim 6, in which $R_x$ is $H_2CF$—.]

[11. 3-benzoylfluoromethanesulfonanilide according to claim 10.]

[12. A compound of the formula:

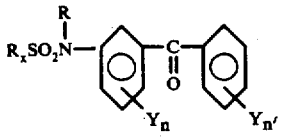

wherein $R_x$ is a haloalkyl group having up to two carbon atoms and at least one halogen atom bonded to the alpha carbon atom or if there is no halogen bonded to said alpha carbon atom, having at least two halogen atoms bonded to the beta carbon atom, provided that the halogen in $R_x$ is selected from chlorine and fluorine; R is hydrogen, methyl, ethyl or a pharmaceutically acceptable cation; each Y is selected from hydroxy, halogen, methyl and methoxy; and n and n′ are each 0–1.]

[13. A compound according to claim 12 of the formula:

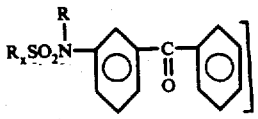

[14. A compound according to claim 2 wherein $R_x$ is trifluoromethyl.]

*15. A compound of the formula*

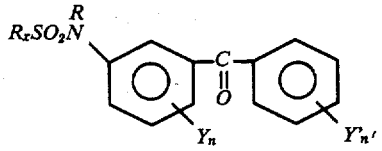

*wherein $R_x$ is a fluoromethyl group, R is hydrogen, alkyl or alkenyl containing not more than three carbon atoms, or a pharmaceutically acceptable cation; each Y and Y′ is selected from hydroxy, halogen and alkyl, alkoxy, haloalkyl and haloalkoxy groups having up to 4 carbon atoms and n and n′ are each 0–3.*

*16. A compound according to claim 15 wherein $R_x$ is $CF_3$—.*

*17. N-methyl 3-benzoyltrifluoromethanesulfonanilide according to claim 16.*

*18. 3-Benzoyl-4-hydroxytrifluoromethanesulfonanilide according to claim 16.*

*19. A compound according to claim 15 in which $R_x$ is $HCF_2$—.*

*20. 3-Benzoyldifluoromethanesulfonanilide according to claim 19.*

*21. The sodium salt of 3-benzoyldifluoromethanesulfonanilide according to claim 19.*

*22. A compound according to claim 15 in which $R_x$ is $H_2CF$—.*

*23. 3-Benzoylfluoromethanesulfonanilide according to claim 22.*

*24. A compound according to claim 15 of the formula:*

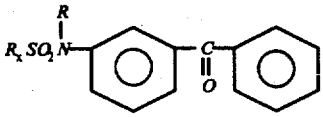

*wherein R is hydrogen, methyl, ethyl or a pharmaceutically acceptable cation.*

* * * * *